United States Patent [19]

Matsuyama

[11] Patent Number: 5,079,463
[45] Date of Patent: Jan. 7, 1992

[54] FLYWHEEL METHOD OF GENERATING SH WAVES

[76] Inventor: Mitsuo Matsuyama, No. 4-5-16-4, Ohtsugaoka, Shonan-cho Higashikatsushika-gun, Chiba-ken, Japan

[21] Appl. No.: 544,832

[22] Filed: Jun. 27, 1990

[30] Foreign Application Priority Data

Jun. 29, 1989 [JP] Japan .................. 1-168019

[51] Int. Cl.⁵ .................. H02K 7/106; G01V 1/00
[52] U.S. Cl. .................. 310/74; 181/121; 310/81
[58] Field of Search .................. 73/667, 672; 181/106, 181/117, 121; 310/74, 81, 89, 77, 78, 105; 367/75

[56] References Cited

U.S. PATENT DOCUMENTS

| | | | |
|---|---|---|---|
| 3,312,841 | 4/1967 | Makino | 310/17 |
| 4,689,509 | 8/1987 | Kumatani et al. | 310/77 |
| 4,982,811 | 1/1991 | Hardee | 181/121 |

FOREIGN PATENT DOCUMENTS

| | | | |
|---|---|---|---|
| 702331 | 12/1979 | U.S.S.R. | 181/121 |
| 1013882 | 4/1983 | U.S.S.R. | 181/121 |
| 1213453 | 2/1986 | U.S.S.R. | 181/121 |

OTHER PUBLICATIONS

Lodde, "Review of Wave Propagation Techniques for Determining the In Situ High-Amplitude Shear Behavior of Geologic Materials," AFWL-TR-79-152, Univ. of New Mexico, 09/80, p. 92.

Primary Examiner—Steven L. Stephan
Assistant Examiner—D. L. Rebsch
Attorney, Agent, or Firm—Kelly Bauersfeld & Lowry

[57] ABSTRACT

An apparatus for generating SH waves comprises a casing, a rotor, stator, a flywheel connected to the rotor and a controller for controlling the rotation of the flywheel. The flywheel is first rotated at a predetermined speed, and then its rotation speed is decreased or increased continuously or intermittently, thereby to generate the SH wave onto an objective solid body.

3 Claims, 1 Drawing Sheet

FLYWHEEL METHOD OF GENERATING SH WAVES

BACKGROUND OF THE INVENTION

This invention relates to an apparatus for and a method of generating (SH Shear Horizontal waves which are used) for probing internal structure of probing objects such as the earth's crust, a material, a living body and the like.

There have been developed various kinds of methods of probing or invetigating the internal structure of the shallow portion of the earth's crust, a material, a living body and the like. However, each method is not necessarily suitable for all probing objects because of the difference in probing objects and resolution. For example, CT (computerized tomography) used widely in the field of medical service is a probing method having a high resolution and reliability. However, there is a case that CT cannot be adapted for, due to the physical property and largeness of a probing object, a probing environment or the like. In the case of probing the internal structure of a body, or electromagnetic field, static electric field, static magnetic field, dynamic displacement, temperature, etc. are measured. Among them, a method of probing the internal structure of a solid body by measuring kinetically dynamic displacement, that is, displacement of elastic P waves (including velocity and acceleration of displacement) is often utilized for earthquake probing or ultrasonic probing because of its relatively high resolution.

In this case, P waves (longitudinal wave compressional wave) as elastic waves are mainly used, however, there may be many cases that S waves (transverse wave shear wave) are more effective. A conventional S wave generating device generates SV waves in addition to SH waves, and propagation pattern of the S wave is very complicated. Further, the P wave is generated at the same time. Therefore, in the survey in which S waves are generated by the conventional S wave generating device are used, a good S/N ratio is not generally obtained.

SUMMARY OF THE INVENTION

It is an object to provide an apparatus for and a method of generating SH waves, which can generate only SH waves as elastic waves without generating other waves.

According to one aspect of this invention, there is provided an apparatus for generating SH waves for probing an objective solid body, comprising: a casing; a rotor supported rotatably in the casing; a stator opposed to the rotor for controlling rotation of the rotor; a flywheel fixed to a rotating shaft of the rotor; a controller for controlling rotational energy of the rotor; and a vibration damping material disposed between the casing and the rotor.

According to another aspect of this invention, there is provided a method of generating SH waves for probing an objective solid body, which comprises the steps of: preparing a flywheel rotatably supported by a support member; rotating the flywheel at a predetermined speed; braking continuously or intermittently the flywheel having been rotating in a certain direction of its rotation or in the reverse direction thereof; and exerting reaction force generated during the braking operation on the objective solid body.

Further objects, features and other aspects of this invention will be understood from the following detailed description of the preferred embodiments of this invention with reference to the drawings.

BRIEF DESCRIPTION OF THE DRAWINGS

In the accompanying drawings.

DETAILED DESCRIPTION OF THE INVENTION

Figure 1:
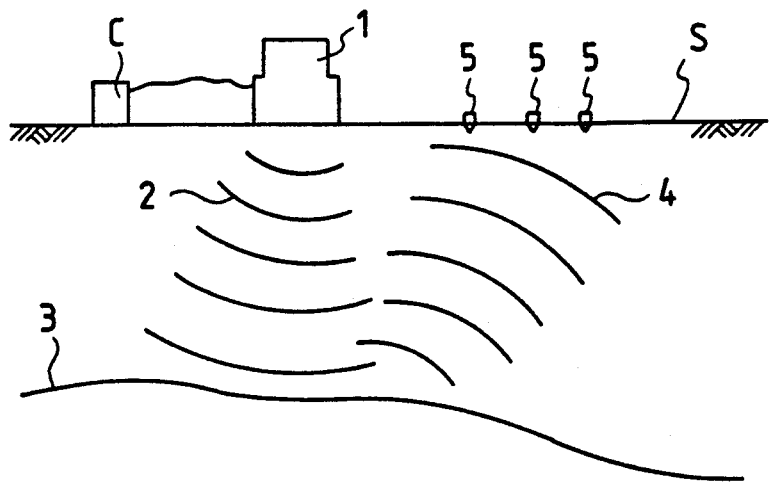
FIG. 1 is a view showing a state wherein an SH wave generating apparatus according to this invention is used.

FIG. 1 shows a state wherein an SH wave generating apparatus 1 is utilized for probing the underground structure. That is, the SH wave generating apparatus 1 according to this invention is set on the ground surface S and its operation is controlled by a controller C. SH waves (horizontal wave of shear waves) generated from the apparatus 1 are transmitted in the earth and reflected from the boundary surface 3. The reflected wave 4 is received by a plurality of receivers 5.5 ... 5 set on the ground surface S to analyze the record of the reflected wave 4 in order to probe the position of the boundary surface.

Figure 2:
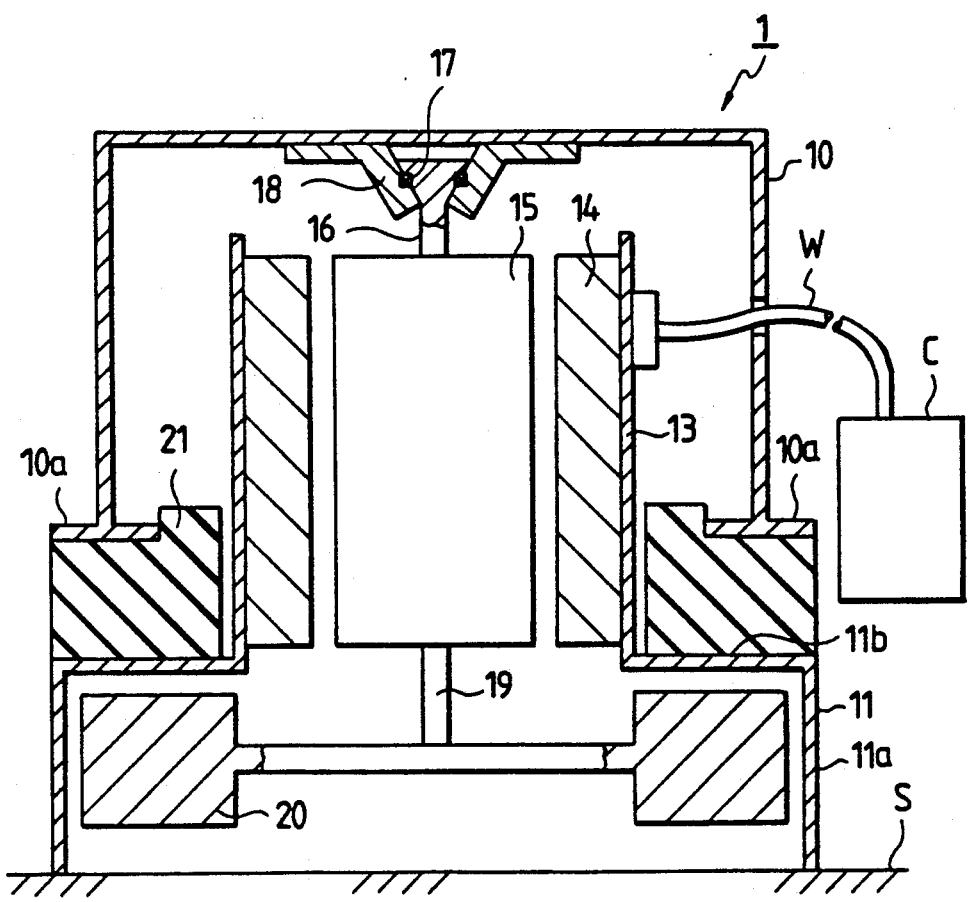
FIG. 2 is a longitudinal sectional view of the SH wave generating apparatus according to this invention.

The SH wave generating apparatus 1 comprises, as shown in FIG. 2, an upper casing 10 and a lower casing 11. The upper casing 10 has a flange 10a at its lower portion, and a rubber material as a vibration damping member 21 is provided between the flange 10a and the lower casing 11. The lower casing 11 has a stator supporting frame 13 as a small diameter portion, at its upper portion, to which a stator 14 is fixed. The lower casing 11 also has a large diameter portion 11a whose lower end contacts the ground surface S and a step portion 11b disposed between the large and small diameter portions 11a, 13. Instead of the rubber material, a spring may be used. A rotor 15 is located rotatably inside the stator 14. From the upper face of the rotor 15 is projected an upper rotating shaft 16 which is supported in a supporting member 18 via a bearing 17. From the lower face of the rotor 15 is projected a lower rotating shaft 19, to the lower end of which the center portion of a flywheel 20 is fixed in the large diameter portion 11a of the lower casing 11, and the flywheel 20 is rotated about the rotating shaft 16, 19. The apparatus 1 has a controller C through a cable W, and the controller c controls the direction of current and the level of voltage or the like to start and stop the rotation fo the flywheel 20 and to increase and decrease the rotational velocity thereof.

The operation of the apparatus will now be explained.

First, after rotating the flywheel 20 at a predetermined (standard) speed by operating the controller C, an operator cuts current flow to rotate the flywheel 20 only by inertia. Thereafter, the operator operates the controller C in such a manner that the flywheel 20 rotated by inertia is braked continuously or in an impulsive manner (intermittently) in a certain rotating direction or the reverse direction so that the original rotary inertia is not remarkably decreased. That is, the rotational speed of the flywheel 20 having been rotating by inertia is decreased or increased in accordance with a desired function such as an impulsive form (delta functio) or a sine curve. The braking operation is performed in a condition that the flywheel 20 is rotated only by inertia, however, the braking operation may be performed in a condition that the flywheel 20 is rotated at a standard speed without cutting current flow. If the flywheel 20 having been rotating by inertia is controlled by the controller C in this manner, its reaction force is exerted on the stator 14, and the reaction force is transmitted to the ground surface S through the supporting frame 13 and the lower casing 11 both connected to the stator 14 thereby to generate only SH waves onto the ground.

The SH wave generating apparatus can vary in its structure in accordance with the largeness, the physical property, etc. of a probing object. For example, in the case of a large-scale underground probing such as a petroleum probing, the power of a motor is remarkably enlarged to increase the inertia moment of the flywheel 20 thereby to generate a large braking reaction force. Further, the increase of the mass of the stator and the casing is restricted to increase the rate of S wave energy exerted on the ground by decreasing the rate at which the braking reaction force is used as kinetic energy of the stator and the casing. In contrast, in the case of probing internal fault or defect of a small solid material, the motor is made small to decrease the inertia moment of the flywheel, and a fine or thin material such as the core of a pencil or a needle are is used as a member for transmitting rotational reaction force to a solid object which the member contacts directly.

The stator and the flywheel are made symmetrically with respect to their rotational axis, and, accordingly, vibration due to their rotation is restricted. In addition, the rotor is supported by a vibration damping material such as a spring or a rubber material in order to prevent the vibration from generating an unnecessary elastic wave onto the solid object.

According to this invention, only simple SH waves can be generated on the probing object, and, therefore, the measured record having a large S/N ratio by the S wave can be obtained in comparison with a conventional apparatus and method, resulting in the increase of resolution, accuracy and completion in internal structure probing using the S wave. Since the SH wave generating apparatus is simple in operational principle, it can be easily manufactured by utilizing a conventional structural and control technique with respect to a motor, and its structure is compact to facilitate its transportation. Further, its setting and operation are also facilitated. The change of the largeness of inertia of the rotor and the flywheel makes possible the manufacture of a SH wave generating apparatus adapted for a defect probing for probing internal defects of a small solid material or a large-scale underground probing such as a petroleum probing. Moreover, if the apparatus is formed in an elongated shape and if a measure for waterproof and a measure for fixing the apparatus onto a wall of a hole formed in the earth are provided, the apparatus can be adapted for a vibrator for a hole in the earth.

On the contrary, since the measured record by the S wave has a relatively high S/N ratio, an internal structure probing method using the S wave can be promoted because the SH wave has the following advantages.

(1) The S wave is smaller in transmittance velocity than the P wave, and, therefore, the measurement by the S wave is more accurate in measurement on the time axis than that by the P wave.

(2) Reflected and refracting waves generated by the SH wave on the boundary surfce of physical property are simple in comparison with those generated by the SV wave (vertical wave of the shear wave) and the P wave on the boundary surface of physical property, and, therefore, extraction and discrimination of objective signals from the measured record by the S wave in cases where only the S wave is generated is easier than extraction and discrimination of objective signals from the measured record by the S wave in cases where the SV wave, P wave or combined wave of the P wave and the SV wave is generated.

(3) With respect to internal structure of a solid body which is used for analysis of dynamic movements of a solid body, it is proper to use a structure corresponding to transmission characteristics of the P wave rather than a structure corresponding to transmission characteristics of the S wave.

What is claimed is:

1. An apparatus for generating SH (shear horizontal) waves for probing an objective solid body, comprising:
   a) a casing set on a surface of the objective solid body;
   b) a rotor supported rotatably in the casing;
   c) a stator opposed to the rotor for controlling electromagnetically rotation of the rotor in a non-contact manner;
   d) a flywheel connected to the rotor for rotation therewith;
   e) a controller for controlling electromagnetically rotational energy of the rotor; and
   f) a vibration damping material disposed between the casing and the rotor,
      the flywheel being rotated at a predetermined speed, rotation of the flywheel being increased or decreased by the controller to exert a reaction force on the casing and thereby generate SH waves applied through said casing to the objective body.

2. An apparatus according to claim 1, wherein said vibration damping material is a rubber material or a spring.

3. An apparatus according to claim 1, wherein said casing comprises an upper casing which has a flange at its lower end and a lower casing which includes a large diameter portion for accommodating said flywheel and a small diameter portion for supporting said stator and a step portion disposed between the large and small diameter portions, said vibration damping material being disposed between said flange and said step portion.

* * * * *